United States Patent
Bayer

(10) Patent No.: US 9,201,429 B2
(45) Date of Patent: Dec. 1, 2015

(54) ACTUATOR FOR A GAS VALVE

(75) Inventor: Detlef Bayer, Wadersloh (DE)

(73) Assignee: MERTIK MAXITROL GMBH & CO. KG, Thale (DE)

(*) Notice: Subject to any disclaimer, the term of this patent is extended or adjusted under 35 U.S.C. 154(b) by 566 days.

(21) Appl. No.: 13/635,302

(22) PCT Filed: Mar. 15, 2011

(86) PCT No.: PCT/EP2011/001267
§ 371 (c)(1),
(2), (4) Date: Sep. 14, 2012

(87) PCT Pub. No.: WO2011/113573
PCT Pub. Date: Sep. 22, 2011

(65) Prior Publication Data
US 2013/0000754 A1    Jan. 3, 2013

(30) Foreign Application Priority Data

Mar. 18, 2010 (DE) .......................... 10 2010 012 435

(51) Int. Cl.
*G05D 16/06* (2006.01)
(52) U.S. Cl.
CPC ......... *G05D 16/0677* (2013.01); *Y10T 137/777* (2015.04); *Y10T 137/7791* (2015.04); *Y10T 137/7793* (2015.04)
(58) Field of Classification Search
CPC .................... G05D 16/0677; Y10T 137/7769; Y10T 137/7788; Y10T 137/7791; Y10T 137/777
USPC ......... 137/487, 487.5, 492, 492.5; 251/30.01, 251/30.02, 30.03, 30.04, 30.05
See application file for complete search history.

(56) References Cited

U.S. PATENT DOCUMENTS 1,490,654 A * 4/1924 Wylie ............................ 137/501
2,081,860 A * 5/1937 Quick ....................... 137/115.05
(Continued)

FOREIGN PATENT DOCUMENTS

CN 201412529 Y 2/2010
DE 10018757 A1 10/2001
(Continued)

OTHER PUBLICATIONS

English language abstract for CN 201412529 extracted from the espacenet.com database on Oct. 4, 2012, 6 pages.
(Continued)

*Primary Examiner* — William McCalister
(74) *Attorney, Agent, or Firm* — Howard & Howard Attorney's PLLC

(57) ABSTRACT

The intention is to provide an actuator which makes it possible to change the opening time and to manually lock the supply of gas. For this purpose, the actuator consists of a housing (9) which is closed by a cover (10). A working diaphragm (8) is clamped between the housing (9) and the cover (10) and subdivides a space enclosed by the housing (9) and the cover (10) into a working pressure chamber (11) and an outlet pressure chamber (13). A lever (15) which is supported on the working diaphragm (8) and acts on a gas valve (2) via a drive plunger (16) is pivotably mounted in the housing (9). The actuator also has an adjustable pressure control valve (6) and a solenoid valve (7). When an inlet pressure line (12) is closed, the solenoid valve (7) opens a connecting channel (28) between the working pressure chamber (11) and the outlet pressure chamber (13). In contrast, in the open position, the inlet pressure line (12) is connected to the working pressure chamber (11) and to the pressure chamber (21). A throttle (29) in the inlet pressure line (12) upstream of the solenoid valve (7) makes it possible to manually set the opening cross section of the inlet pressure line (12).

11 Claims, 4 Drawing Sheets

(56) References Cited

U.S. PATENT DOCUMENTS

Figure 1:
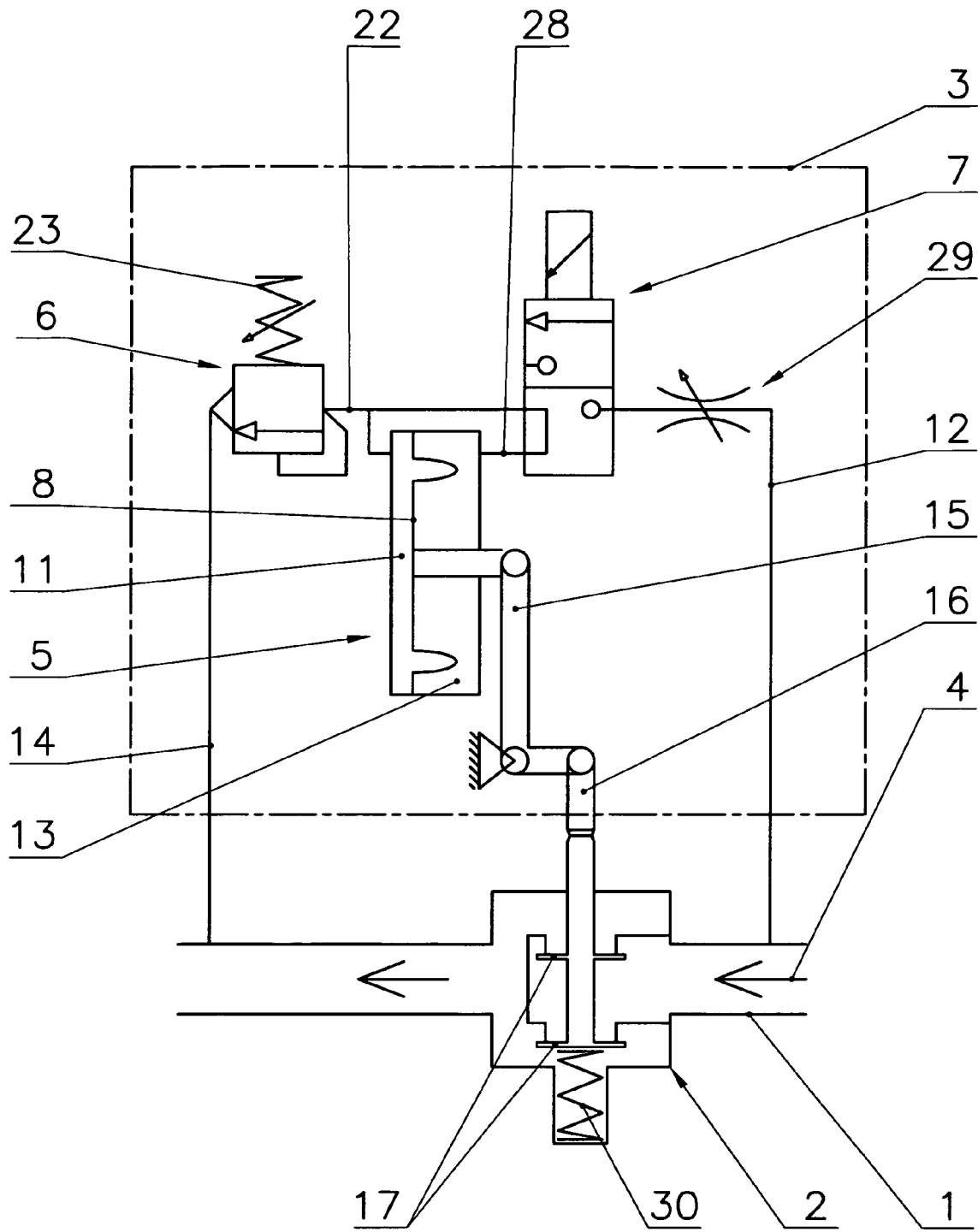

| | | | | |
|---|---|---|---|---|
| 2,156,823 | A * | 5/1939 | Stettner | 137/505.42 |
| 2,324,579 | A * | 7/1943 | Hart | 137/492 |
| 2,477,897 | A * | 8/1949 | Ray | 251/30.01 |
| 2,526,972 | A * | 10/1950 | Ray | 137/80 |
| 2,793,075 | A * | 5/1957 | Gulick, Jr. | 239/126 |
| 2,819,728 | A * | 1/1958 | Gage et al. | 137/505.39 |
| 2,877,791 | A * | 3/1959 | Rich | 137/487 |
| 2,965,128 | A * | 12/1960 | Silver | 137/492 |
| 2,971,537 | A * | 2/1961 | Kowalski et al. | 137/636.1 |
| 3,053,448 | A * | 9/1962 | Au Werter et al. | 236/80 R |
| 3,122,318 | A * | 2/1964 | Null | 236/87 |
| 3,153,424 | A * | 10/1964 | Acker et al. | 137/505.41 |
| 3,181,040 | A * | 4/1965 | Viale et al. | 335/260 |
| 3,207,175 | A * | 9/1965 | Pauly | 137/505.46 |
| 3,259,274 | A * | 7/1966 | Klasson et al. | 222/48 |
| 3,308,846 | A * | 3/1967 | Yuile | 137/487.5 |
| 3,512,549 | A * | 5/1970 | Wiegand | 137/489 |
| 4,076,041 | A * | 2/1978 | Christianson | 137/490 |
| 4,245,669 | A * | 1/1981 | Schmidt | 137/550 |
| 4,671,319 | A * | 6/1987 | Namand | 137/492.5 |
| 4,782,850 | A * | 11/1988 | Duffy et al. | 137/116.5 |
| 4,850,345 | A * | 7/1989 | Jackson | 128/202.27 |
| 5,443,186 | A * | 8/1995 | Grill | 222/396 |
| 6,068,014 | A * | 5/2000 | Tomita | 137/116.5 |
| 6,186,168 | B1 * | 2/2001 | Schultz et al. | 137/505.11 |
| 7,845,522 | B2 * | 12/2010 | Grill | 222/399 |
| 8,256,446 | B2 * | 9/2012 | Hawkins et al. | 137/116.5 |
| 2009/0260697 | A1 * | 10/2009 | Mevius et al. | 137/484.2 |
| 2010/0071786 | A1 * | 3/2010 | Hawkins et al. | 137/485 |

FOREIGN PATENT DOCUMENTS

| | | |
|---|---|---|
| EP | 0109978 A1 | 6/1986 |
| EP | 1106923 A2 | 6/2001 |
| FR | 1379084 A | 11/1964 |
| FR | 2373094 A1 | 6/1978 |
| WO | WO 2011113573 A1 | 9/2011 |

OTHER PUBLICATIONS

English language abstract and machine-assisted translation for DE 10018757 extracted from the espacenet.com database on Oct. 4, 2012, 11 pages.

English language abstract and machine-assisted translation for EP 0109978 extracted from the espacenet.com database on Oct. 4, 2012, 28 pages.

English language abstract not available for FR 1379084; however, see machine-assisted translation extracted from the espacenet.com database on Oct. 4, 2012, 18 pages.

English language abstract not available for FR 2373094; however, see machine-assisted translation extracted from the espacenet.com database on Oct. 4, 2012, 13 pages.

English language abstract and machine-assisted translation for WO 2011113573 extracted from the espacenet.com database on Oct. 4, 2012, 30 pages.

International Search Report for Application No. PCT/EP2011/001267 dated Jun. 24, 2011, 4 pages.

* cited by examiner

ACTUATOR FOR A GAS VALVE

The subject patent application claims priority to and all the benefits of International Application No. PCT/EP2011/001267 filed Mar. 15, 2011, which claims priority to German Patent Application No. 10 2010 012 435.4 filed Mar. 18, 2010, both of which are hereby incorporated by reference.

BACKGROUND OF THE INVENTION

The invention relates to an actuator for a gas valve for regulating the pressure and shutting off the gas flow in a gas conduit.

STATE OF THE ART

Gas valves with actuators are used upstream of gas consumer installations. These gas valves regulate the pressure of the gas flow. They also enable the gas flow to be shut off.

A gas valve is therefore known from DE 100 18 757 A1 for regulating the pressure and shutting off the gas flow. This gas valve comprises two main valves connected in series, each of which is controlled by a diaphragm, with each diaphragm forming an initial and a second chamber in a diaphragm housing, wherein the initial chamber is connected to a control pressure line which is connected to the gas conduit upstream of the main valves.

Each main valve has two closing bodies with one closing body loaded by the gas flow in the direction of closing and the other closing body loaded in the direction of opening. The control pressure is set in the two initial chambers according to the outlet pressure. The pressure of the gas flow between the two control elements is applied to the two second chambers.

A disadvantage with this known gas valve is that in order to achieve the required regulating powers an increase in pressure is required which is provided by installing an additional pump, thereby making the device more costly and complicated to construct. In addition, with this gas valve it is not possible to change the opening time or to shut off the gas valve manually.

An additional gas control device with a servo pressure regulator is described in EP 0 109 978 A1. With this gas control device the control pressure of the servo pressure regulator determining the gas flow rate is applied to the closing body of the main valve in the opening direction via a diaphragm of the servo pressure regulator. In this process the diaphragm moving the closing body of the main valve forms a part of the chamber wall of the chamber (34) of the servo pressure regulator which conducts the control pressure.

A solenoid valve serves to switch on and shut off the gas supply to the servo pressure regulator, with the inlet pressure applied to the closing body of the solenoid valve in the closing direction. In addition, a connecting channel with a throttle point serving as a vent for the control pressure chamber is provided between the gas outlet and a space separated from the gas inlet by the solenoid valve and connected via a throttle point to the control pressure chamber.

A disadvantage with this gas control device too is that it is not possible to change the opening time or to shut off the gas valve manually. Furthermore, a closing force of a correspondingly high value must be provided in order to ensure leak tightness, especially for a back pressure test which is frequently required in practice. A correspondingly high opening force must therefore also be provided. This leads to a gas control device of large dimensions because of the resulting diameter of the directly acting diaphragm.

SUMMARY OF THE INVENTION

The present invention addresses the problem of developing an actuator for a gas valve of the named type which enables the opening time to be changed and the supply of gas to be manually locked. Furthermore, the design of the device is to be as compact as possible.

The problem is solved according to the invention in that the actuator for gas valves comprises a housing that is closed by a cover. A working diaphragm is clamped between the housing and the cover and subdivides a space enclosed by the housing and cover into a working pressure chamber on the cover side connected to the inlet side of the gas valve by an inlet pressure line, and into an outlet pressure chamber on the housing side connected by an outlet pressure line to the outlet side of the gas valve. A lever, which on the one hand is supported on the working diaphragm and on the other hand acts on a closing body of the gas valve via a drive plunger, is pivotably mounted in the housing.

The use of a pivotably mounted lever enables the forces to be determined by means of the leverage ratio such that a compact design is achieved.

In addition, the actuator has a pressure control valve that can adjusted by a spring, and a double-acting solenoid valve. The pressure chamber of the pressure control valve is connected to the outlet pressure line via a valve seat that can be closed by a cover. The double-acting solenoid valve opens a connecting channel between the working pressure chamber and the outlet pressure chamber in the closed position, i.e. when the inlet pressure line is closed, whereas the inlet pressure line is connected to the working pressure chamber and the pressure chamber in the open position.

A throttle in the inlet pressure line upstream of the solenoid valve enables the opening cross section of the inlet pressure line to be manually set.

A solution has therefore been devised which eliminates the disadvantages in the state of the art referred to above.

Another possible embodiment of the invention comprises replacing the working diaphragm by a pneumatic motor and the pivotably mounted lever by a screw drive.

EXECUTION EXAMPLE

Figure 2:
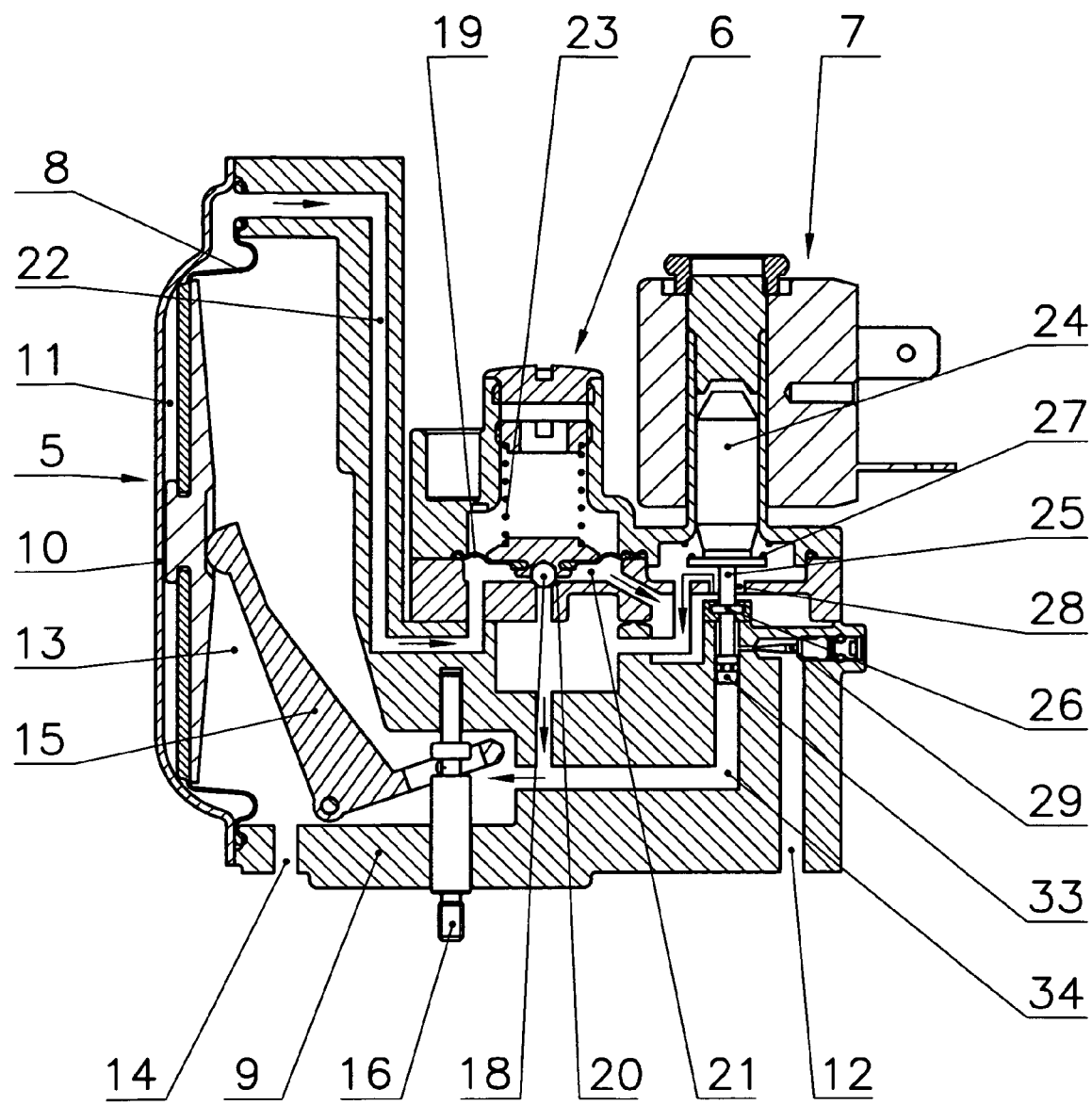
Figure 3:
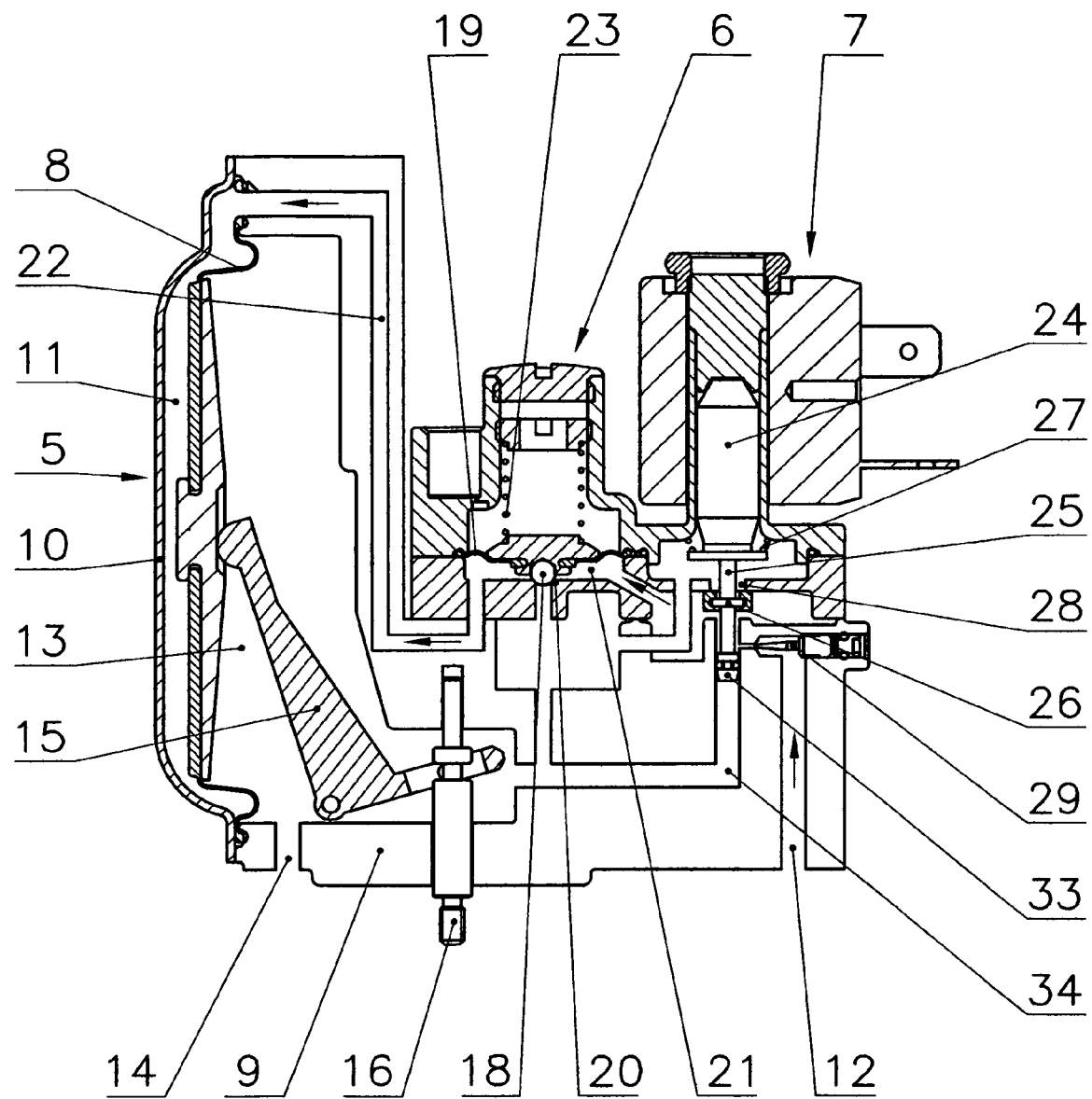
Figure 4:
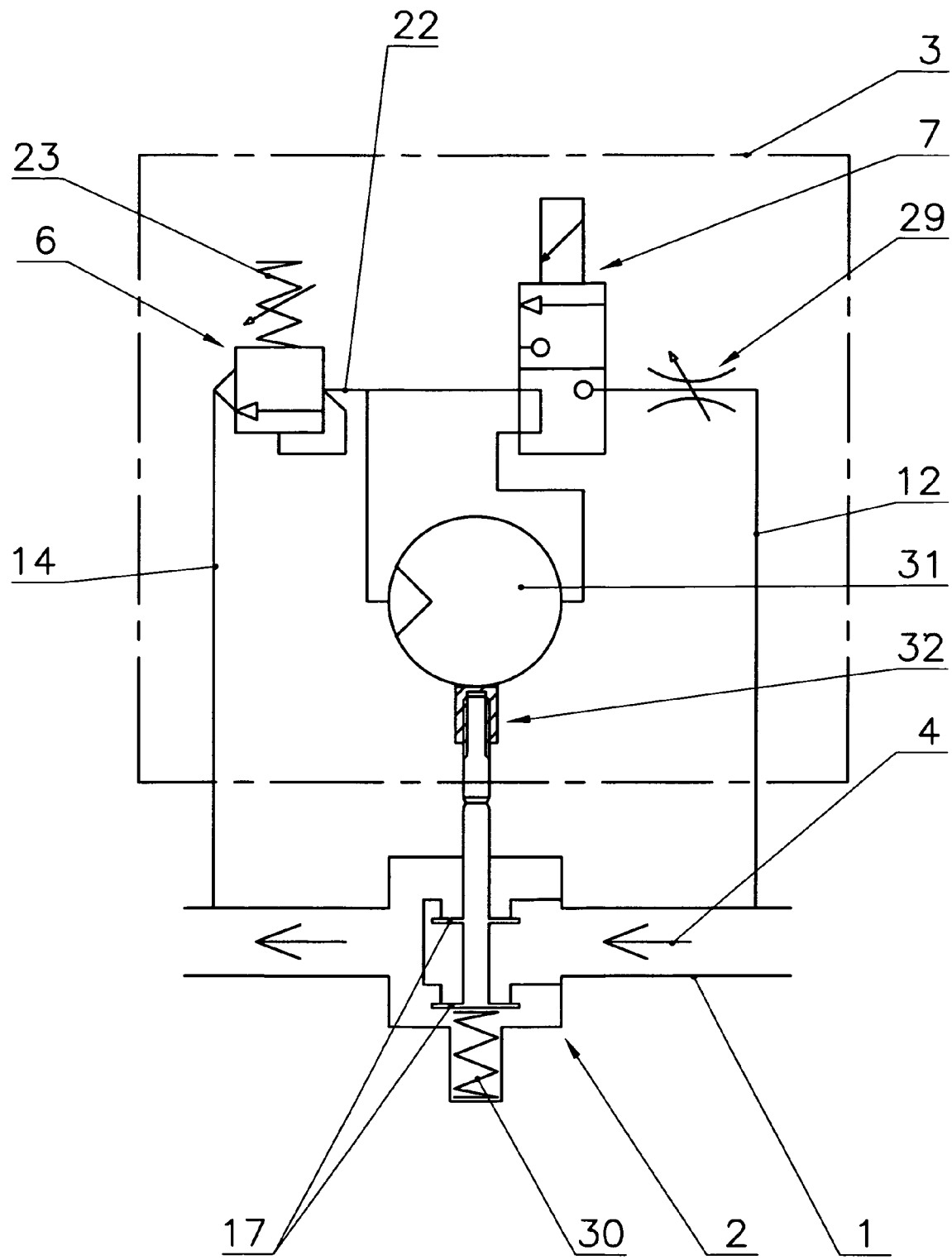

Exemplary embodiments of an actuator according to the invention with a gas valve are explained in more detail below by means of execution examples. The diagrams show the following details:

FIG. 1 a schematic representation of an execution example of an actuator according to the invention with a gas valve, FIG. 2 a section of an actuator according to the invention for a gas valve in the closed state, FIG. 3 a section of an actuator according to the invention for a gas valve in the open state, FIG. 4 a schematic representation of another embodiment of an actuator according to the invention with a gas valve.

FIG. 1 depicts a gas valve 2, in this execution example a double-acting gas valve, which is fitted in a gas conduit 1 and whose valve position can be affected by an actuator 3 which is depicted in FIGS. 2 and 3 without gas valve 2. Gas can flow through the gas conduit 1 in the direction shown by a directional arrow 4 when the gas valve 2 is open.

The actuator 2 comprises the following functional units:
Diaphragm actuator 5
Pressure control valve 6
Solenoid valve 7

As can be seen from the schematic representation in FIG. 1, and in more detail in FIGS. 2 and 3, the diaphragm actuator 5 comprises a working diaphragm 8 which is clamped between a housing 9 and a cover 10 closing the housing 9. The space enclosed by the working diaphragm 8 and the cover 10 forms a working pressure chamber 11 which is connected by an inlet pressure line 12 to the inlet side of the gas valve 2, whereas the working diaphragm 8 and the housing 9 form an outlet pressure chamber 13 which is connected by an outlet pressure line 14 to the outlet side of the gas valve 2.

A lever 15 is pivotably mounted in the housing 9 and is on the one hand supported on the working diaphragm and is on the other hand connected to a drive plunger 16 in such a way that the pivoting movement of the lever 15 is converted into a linear movement of the drive plunger 16, whereby the position of the closing bodies 17 of the gas valve 2 is affected. In this case there are two closing bodies.

The required reset force on the lever 15 is provided advantageously here by a return spring 30 in the gas valve 2 and/or by the existing reset force of the working diaphragm 8, taking into account the forces arising because of the leverage ratio. It is of course also possible to have a spring supported in the housing 9 act directly on the lever 15.

As can also be seen from FIGS. 2 and 3, the housing 9 has a pressure control valve 6 whose cover comprises a diaphragm 19 supporting a ball 18. The associated valve seat 20 forms the outlet-side connection of the pressure chamber 21 of the pressure control valve 6 to the outlet pressure line 14. The cover is loaded in the closing direction by an adjustable setpoint spring 23. The pressure chamber 21 is connected to the working pressure chamber 11 of the diaphragm actuator 5 by a channel 22.

A double-acting solenoid valve 7 fastened to the housing 9 extends into the housing 9 with a plunger 25 connected to the armature 24, and a valve body 26 on the plunger 25 closes the inlet pressure line 12 in the de-energised state under the action of forces of a closing spring 27. At the same time, a connecting channel 28 is opened in this position between the working pressure chamber 11 and the outlet pressure chamber 13.

In this execution example the plunger 25 has at its end facing away from the armature 24 a piston 33 which extends into a gas duct 34 connected to the outlet pressure chamber 13 and closes said duct gastight. In this process the pressure prevailing in the outlet pressure chamber 13 is applied to the piston 33. This prevents the valve body 26 from being opened by the inlet pressure prevailing in the inlet pressure line 12 despite the solenoid valve 7 being de-energised.

If, however, the solenoid valve 7 is energised, as shown in FIG. 3, the armature 24 is attracted against the force of the closing spring 27, and the connecting channel 28 between the working pressure chamber 11 and the outlet pressure chamber 13 is closed, whereas the inlet pressure line 12 is connected to the working pressure chamber 11 and the pressure chamber 21.

A throttle 29 extending into the inlet pressure line 12 is disposed (in this case screwed in) upstream of the solenoid valve 7. The opening cross section of the inlet pressure line 12 and therefore the opening time are changed by manually changing the screw-in depth, a process which can be carried out externally. This also enables the inlet pressure line 12 to be closed manually independently of the solenoid valve 7.

The mode of operation of this actuator according to the invention is as follows: on activation of the solenoid valve 7 the actuator 3 according to the invention described in the execution example above assumes the position shown in FIG. 3. The armature 24 is attracted and the inlet pressure line 12 is opened via the valve body 26. The pressure prevailing in the inlet pressure line 12 reaches the pressure chamber 21 of the solenoid valve 7 and the working pressure chamber 11 of the diaphragm actuator 5 through channels via the throttle 29, as shown by the explanatory arrows. The working diaphragm 8 moves and activates the gas valve 2 via the lever 15 and the drive plunger 16. The duration of this operation depends on the setting of the throttle 29 and the resulting opening cross section.

It is also possible to completely close the inlet pressure line 12 by manually setting the throttle 29. The gas conduit 1 can therefore be kept closed by the gas valve 2 independently of activating the solenoid valve 7.

If the pressure in the pressure chamber 21 rises above the pressure preset by the setpoint spring 23, the ball 18 rises from the valve seat 20 and opens the outlet to the outlet pressure line 14 through which the pressure is released. The pressure in the pressure chamber 21 is therefore kept constant independently of the pressure in the inlet pressure line 12 and the position of the drive plunger 16.

If the solenoid valve 7 is de-energised, the position assumed is as shown in FIG. 2. The armature 24 drops out and the valve body 26 closes the inlet pressure line 12. At the same time, the connecting channel 28 is opened and connects the working pressure chamber 11 and the outlet pressure chamber 13, as is also shown by the explanatory arrows. The diaphragm 8 returns to its initial position and the gas valve 2 is closed extremely quickly via the lever 15 and the drive plunger 16.

FIG. 4 shows a schematic representation of another execution example of an actuator also according to the invention. A diaphragm actuator 5 is not used in this example: a pneumatic motor 31 is used instead of the working diaphragm 8. Transmission to the gas valve 2 is then effected by a screw drive 32 instead of by the pivotably mounted lever 15.

The invention claimed is:
1. An actuator for gas valves, comprising
a housing (9) that is closed by a cover (10), wherein a working diaphragm (8) is clamped between the housing (9) and the cover (10) and subdivides the space enclosed by housing (9) and cover (10) into a working pressure chamber (11) on the cover side connected by an inlet pressure line (12) to the inlet side of the gas valve (2), and into an outlet pressure chamber (13) on the housing side connected by an outlet pressure line (14) to the outlet side of the gas valve (2),
a lever (15) which is pivotably mounted in the housing (9) and which on the one hand is supported on the working diaphragm (8), and which on the other hand acts on a closing body (17) of the gas valve (2) via a drive plunger (16),
a pressure control valve (6) which can be adjusted by a setpoint spring (23) and whose pressure chamber (21) is connected to the outlet pressure line (14) via a valve seat (20) that can be closed by a cover,
a double-acting solenoid valve (7) which closes the inlet pressure line (12) in the closed state and at the same time opens a connecting channel (28) between the working pressure chamber (11) and the outlet pressure chamber (13), whereas the inlet pressure line (12) is connected to the working pressure chamber (11) and the pressure chamber (21) when the solenoid valve is opened (7),
a throttle (29) which is disposed in the inlet pressure line (12) upstream of the solenoid valve (7) and which enables the opening cross section of the inlet pressure line (12) to be manually set.

2. An actuator for a gas valve (2), the actuator comprising:
a housing (9),
a closing body (17) supported by the housing (9) for disposition between an inlet side and an outlet side of the gas valve (2) to open and close the gas valve (2),
a cover (10) connected to the housing (9),
a working diaphragm (8) disposed between the housing (9) and the cover (10) defining a working pressure chamber (11) between the cover (10) and the diaphragm (8) and an outlet pressure chamber (13) between the housing (9) and the diaphragm (8),
an inlet pressure line (12) in communication with the working pressure chamber (11) for communicating pressure between the inlet side of the gas valve (2) and the working pressure chamber (11),
an outlet pressure line (14) in communication with the outlet pressure chamber (13) for communicating pressure between outlet side of the gas valve (2) and the outlet pressure chamber (13),
a lever (15) pivotably mounted to the housing (9) and coupled to the working diaphragm (8) and the closing body (17) for transmitting movement from the working diaphragm (8) to the closing body (17), and
a spring (30) coupled to the closing body (17) for urging the lever (15) against the working diaphragm (8),
wherein the housing (9) defines a pressure chamber (21) and wherein a pressure control valve (6) is disposed in the pressure chamber (21) between the inlet pressure line (12) and the working pressure chamber (11), the pressure control valve (6) being configured to open to the outlet pressure line (14) when pressure in the pressure chamber (21) rises above a pressure preset.

3. An actuator for a gas valve (2), the actuator comprising:
a housing (9),
a closing body (17) supported by the housing (9) for disposition between an inlet side and an outlet side of the gas valve (2) to open and close the gas valve (2),
a cover (10) connected to the housing (9),
a working diaphragm (8) disposed between the housing (9) and the cover (10) defining a working pressure chamber (11) between the cover (10) and the diaphragm (8) and an outlet pressure chamber (13) between the housing (9) and the diaphragm (8),
an inlet pressure line (12) in communication with the working pressure chamber (11) for communicating pressure between the inlet side of the gas valve (2) and the working pressure chamber (11),
an outlet pressure line (14) in communication with the outlet pressure chamber (13) for communicating pressure between outlet side of the gas valve (2) and the outlet pressure chamber (13),
a lever (15) pivotably mounted to the housing (9) and coupled to the working diaphragm (8) and the closing body (17) for transmitting movement from the working diaphragm (8) to the closing body (17), and
a spring (30) coupled to the closing body (17) for urging the lever (15) against the working diaphragm (8),
wherein the housing (9) defines a pressure chamber (21) and wherein a pressure control valve (6) is disposed in the pressure chamber (21) between the inlet pressure line (12) and the working pressure chamber (11), the pressure control valve (6) being configured to open to the outlet pressure line (14) when pressure in the pressure chamber (21) rises above a pressure preset; and
wherein the housing (9) defines a valve seat (20) between the pressure chamber (21) and the outlet pressure chamber (13) and wherein the pressure control valve (6) includes a ball (18) moveable to open and close the valve seat (20).

4. An actuator for a gas valve (2), the actuator comprising:
a housing (9),
a closing body (17) supported by the housing (9) for disposition between an inlet side and an outlet side of the gas valve (2) to open and close the gas valve (2),
a cover (10) connected to the housing (9),
a working diaphragm (8) disposed between the housing (9) and the cover (10) defining a working pressure chamber (11) between the cover (10) and the diaphragm (8) and an outlet pressure chamber (13) between the housing (9) and the diaphragm (8),
an inlet pressure line (12) in communication with the working pressure chamber (11) for communicating pressure between the inlet side of the gas valve (2) and the working pressure chamber (11),
an outlet pressure line (14) in communication with the outlet pressure chamber (13) for communicating pressure between outlet side of the gas valve (2) and the outlet pressure chamber (13),
a lever (15) pivotably mounted to the housing (9) and coupled to the working diaphragm (8) and the closing body (17) for transmitting movement from the working diaphragm (8) to the closing body (17), and
a spring (30) coupled to the closing body (17) for urging the lever (15) against the working diaphragm (8),
wherein the housing (9) defines a pressure chamber (21) and wherein a pressure control valve (6) is disposed in the pressure chamber (21) between the inlet pressure line (12) and the working pressure chamber (11), the pressure control valve (6) being configured to open to the outlet pressure line (14) when pressure in the pressure chamber (21) rises above a pressure preset;
wherein the housing (9) defines a valve seat (20) between the pressure chamber (21) and the outlet pressure chamber (13) and wherein the pressure control valve (6) includes a ball (18) moveable to open and close the valve seat (20),
wherein the pressure control valve (6) includes a cover and a setpoint spring (23) disposed between the cover and the ball (18) for urging the ball (18) into contact with the valve seat (20).

5. An actuator for a gas valve (2), the actuator comprising:
a housing (9),
a closing body (17) supported by the housing (9) for disposition between an inlet side and an outlet side of the gas valve (2) to open and close the gas valve (2),
a cover (10) connected to the housing (9),
a working diaphragm (8) disposed between the housing (9) and the cover (10) defining a working pressure chamber (11) between the cover (10) and the diaphragm (8) and an outlet pressure chamber (13) between the housing (9) and the diaphragm (8),
an inlet pressure line (12) in communication with the working pressure chamber (11) for communicating pressure between the inlet side of the gas valve (2) and the working pressure chamber (11),
an outlet pressure line (14) in communication with the outlet pressure chamber (13) for communicating pressure between outlet side of the gas valve (2) and the outlet pressure chamber (13),
a lever (15) pivotably mounted to the housing (9) and coupled to the working diaphragm (8) and the closing body (17) for transmitting movement from the working diaphragm (8) to the closing body (17), and a spring (30) coupled to the closing body (17) for urging the lever (15) against the working diaphragm (8), wherein the housing (9) defines a pressure chamber (21) and wherein a pressure control valve (6) is disposed in the pressure chamber (21) between the inlet pressure line (12) and the working pressure chamber (11), the pressure control valve (6) being configured to open to the outlet pressure line (14) when pressure in the pressure chamber (21) rises above a pressure preset;

wherein the housing (9) defines a valve seat (20) between the pressure chamber (21) and the outlet pressure chamber (13) and wherein the pressure control valve (6) includes a ball (18) moveable to open and close the valve seat (20), and wherein the pressure control valve (6) includes a diaphragm (19) that supports the ball (18).

6. The actuator as set forth in claim 1 further comprising a solenoid valve (7) in communication with the working pressure chamber (11), the inlet pressure line (12) and the outlet chamber (13), wherein the solenoid valve (7) is movable to alternately provide communication between the working pressure chamber (11) and the inlet pressure line (12) or between the working pressure chamber (11) and the outlet pressure chamber (13).

7. The actuator as set forth in claim 6 further comprising a throttle (29) extending into the inlet pressure line (12) upstream of the solenoid valve (7).

8. The actuator as set forth in claim 1 further comprising a throttle (29) extending into the inlet pressure line (12).

9. The actuator as set forth in claim 2 wherein the housing (9) defines a valve seat (20) between the pressure chamber (21) and the outlet pressure chamber (13) and wherein the pressure control valve (6) includes a ball (18) moveable to open and close the valve seat (20).

10. The actuator as set forth in claim 9 wherein the pressure control valve (6) includes a cover and a setpoint spring (23) disposed between the cover and the ball (18) for urging the ball (18) into contact with the valve seat (20).

11. The actuator as set forth in claim 9 wherein the pressure control valve (6) includes a diaphragm (19) that supports the ball (18).

* * * * *